United States Patent [19]

Takahashi et al.

[11] Patent Number: 4,577,664

[45] Date of Patent: Mar. 25, 1986

[54] CONDUIT TUBE OF AN ELECTRODE DEVICE FOR ELECTRICALLY HEATING UNDERGROUND HYDROCARBON RESOURCES

[75] Inventors: Ichiro Takahashi, Suita; Goro Okamoto, Itami; Kazuo Okahashi, Toyonaka, all of Japan

[73] Assignee: Mitsubishi Denki Kabushiki Kaisha, Tokyo, Japan

[21] Appl. No.: 601,278

[22] Filed: Apr. 17, 1984

[51] Int. Cl.$^4$ .................... F16L 9/14; B65H 81/00
[52] U.S. Cl. ..................... 138/149; 138/143; 138/145; 138/146; 138/DIG. 6; 138/DIG. 7; 138/177; 174/47; 174/110 SR; 264/280
[58] Field of Search ............... 138/140, 141, 143, 145, 138/146, 149, DIG. 6, DIG. 7, 177; 174/47, 110 SR; 528/125; 428/36, 460, 494, 501, 524; 285/45, 47; 427/195, 318, 388.2; 264/280

[56] References Cited

U.S. PATENT DOCUMENTS

| | | | |
|---|---|---|---|
| 3,931,836 | 1/1976 | Thiele | 138/145 X |
| 4,213,486 | 7/1980 | Samour et al. | 138/145 X |
| 4,331,798 | 5/1982 | Staniland | 528/125 |
| 4,435,350 | 3/1984 | Fukushima et al. | 528/125 X |
| 4,481,239 | 11/1984 | Eckner | 138/145 X |
| 4,500,577 | 2/1985 | Satake et al. | 138/145 X |

Primary Examiner—James E. Bryant, III
Attorney, Agent, or Firm—Oblon, Fisher, Spivak, McClelland & Maier

[57] ABSTRACT

A conduit tube of an electrode device for electrically heating underground hydrocarbon resources, which comprises: a metal conduit tube and an electrically insulative covering adhered on and around the outer peripheral surface of said metal conduit tube, said electrically insulative covering being formed by adhering polyether/ether/ketone resin in powder form having particle size of a range of from 10 to 100 μm on and around said metal conduit tube which has been preheated to a temperature range of from 350° C. to 450° C. by the electrostatic coating method, and fusion-bonding the electrically insulative covering material thereon at said temperature range of the preheating.

8 Claims, 4 Drawing Figures

CONDUIT TUBE OF AN ELECTRODE DEVICE FOR ELECTRICALLY HEATING UNDERGROUND HYDROCARBON RESOURCES

This invention relates to a conduit tube having electrically insulating coating and being used for extracting underground hydrocarbon resources by the electric heating method.

Throughout the present specification, the term "underground hydrocarbon resources" refers to bituminous substances contained in oil sand or tar sand, hence it will be called hereinafter simply "oil", unless otherwise specified.

With steep rise in price of the oil resources, in recent years, full-scaled studies are under way in extracting oil content from deposit of oil sand laid under the ground in Canada, Venezuela, and various other countries. This deposit of oil sand usually exists under the ground as deep as a few to several hundred meters and in a layer of approximately 50 meters or so in thickness. However, since this oil sand is highly viscous, it can not be taken out of the earth by pumping-up operation at a normal temperature. It has therefore been a practice so far to employ a method, by which heated water vapor is ejected into and through the oil sand deposit to raise the temperature of the oil content in the deposit and to lower its viscosity, thereby enabling the oil content to be pumped up.

This method, however, is so poor in its operating efficiency that it inevitably pushes up the operating cost for the extraction. On account of such shortcoming in the conventional method of extraction, studies and researches have been conducted in full swing for a method of oil extraction with better operating efficiency and higher productivity, according to which a pair of conduit tubes of steel or stainless steel for the oil extraction with an electrode part being attached to the bottom end part of each of them are buried deep under the ground so that the electrode part may be positioned at and in the oil sand deposit, while they are separated each other at a distance in a range of from about 30 to 200 meters, and then a high tension voltage of from several hundreds to several thousands volts is applied across the two electrodes to raise the temperature of the oil sand deposit with the Joule heat so as to reduce viscosity of the oil sand.

In the above-described method of oil extraction, since the oil sand deposit has resistivity which is several times as high as that of the ground stratum above the deposit, it is imperative that the portion of the conduit tube to be buried in the ground stratum be covered with an electrically insulating material so as not to permit electric current to flow in and through the ground stratum above the oil sand deposit. Unless this portion of the conduit tube is covered with the electrically insulating material, electric current flows in and through the ground stratum alone, and no current flows across the electrodes buried in the oil sand deposit. As the consequence of this, there have been rising demands for development of the conduit tube covered with the electrically insulating material and being capable of undergoing such special conditions in its use.

The characteristics which the electrically insulating material should possess are as follows.

(a) it has a voltage withstand characteristic of from several hundreds to several thousands volts and a volume resistivity value of $10^6$ ohm-cm and above, not only at a normal temperature level but also at a temperature level of about 300° C., at which viscosity of the oil content in the oil sand deposit can be decreased;

(b) it is durable against hot water of approximately 300° C. in order for water contained in the oil sand deposit to be heated to an elevated temperature (about 300° C.), at which viscosity of the oil sand deposit can be decreased; and (c) it has a mechanical strength of such a degree that is able to support and suspend the electrode on and from the bottom end part of the conduit tube with the electrically insulating material being provided therearound, and also has a mechanical impact strength of such a degree that does not bring about breakage of the electrically insulating material around the conduit tube by its contact with the wall of the bore-hole, when the electrode supported on and suspended from the bottom end part of the conduit tube is going to be buried into the oil sand deposit through the bore-hole for burying; and others.

With a view to attaining the above-mentioned purpose, attempts have so far been made as to use of polyethylene resin, nylon, epoxy resin, and various other materials. However, polyethylene resin is not durable against heat, which melts at a temperature of 100° C. and below, nylon is also not durable against hot water and brings about hydrolysis at a temperature of about 100° C. or so, and epoxy resin also brings about hydrolysis at a temperature of 150° C. or so to lower the electrical insulation. Thus, these materials are poor in their practical utility.

The present invention has been made in view of the above-described various circumstances, and aims at providing a conduit tube of an electrode device for electrically heating underground hydrocarbon resources, which is provided thereon with an electrically insulative covering excellent in its voltage withstand characteristic, heat-resistant property, and mechanical strength.

According to the present invention, in general aspect of it, there is provided a conduit tube of an electrode device for electrically heating underground hydrocarbon resources, which comprises: a metal conduit tube; and an electrically insulative covering adhered on and around the outer peripheral surface of said metal conduit tube, said electrically insulating covering being formed by adhering polyether/ether/ketone resin in powder form having particle size of a range of from 10 to 100 μm on and around said metal conduit tube which has been preheated to a temperature range of from 350° C. to 450° C. by the electrostatic coating method, and fusion-bonding the electrically insulative covering material thereon at said temperature range of the preheating of from 350° C. to 450° C.

The foregoing object, other objects as well as the specific materials used and the manner of forming the insulative covering according to the present invention will become more apparent and understandable from the following detailed description and several preferred examples thereof, when read in conjunction with the accompanying drawing.

In the following, explanations will be given in reference to the accompanying drawing as to the first embodiment of the electrically insulated conduit tube according to the present invention.

Figure 1:
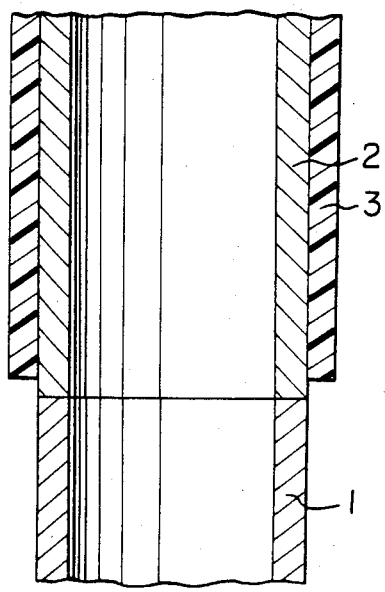
FIG. 1 is a longitudinal cross-sectional view, in part, showing the bottom end part of the conduit tube covered with the electrically insulating material according to one embodiment of the present invention.

FIG. 1 illustrates a longitudinal cross-sectional view, in part, showing the bottom end part of the conduit tube coated with the electrically insulative covering. As shown in FIG. 1, the insulating member 3 of the polyether/ether/ketone resin is coated by the electrostatic powder coating method on the outer peripheral surface of the metal conduit tube 2 having the electrode 1 connected at its bottom end part.

In general, the conduit tube 2 is required to be as long as about 200 meters to about 600 meters in its full length. However, since ordinary steel tube or stainless steel tube has a length of from 5 to 50 meters per piece, a plurality of conduit tubes of such length are joined one after the other, when the forward end of the foremost tube having the electrode connected at its distal end is being inserted into the oil sand deposit.

Figure 2:
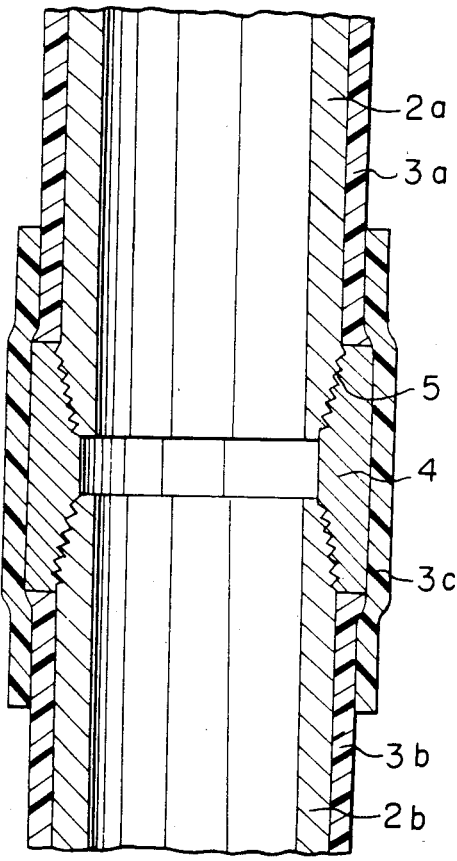
FIG. 2 is a longitudinal cross-sectional view showing a joined portion of the conduit tubes shown in FIG. 1.

FIG. 2 illustrates a longitudinal cross-sectional view, in part, of a joined portion of the conduit tubes, each being coated with the electrically insulative covering. As shown in FIG. 2, the conduit tube 2a coated with the insulating member 3a of polyether/ether/ketone resin and the conduit tube 2b coated with the insulating member 3b of polyether/ether/ketone resin are joined together by means of a coupling 4 which is screw-fitted with both conduit tubes 2a and 2b through tapered thread 5 formed at the end part, and on the outer peripheral surface, of each of the tubes. In this case, the joined portion, i.e., the outer peripheral surface of the coupling 4 and the end parts of both conduit tubes are further coated with the insulating member 3 of polyether/ether/ketone resin, to prevent current leakage.

For the polyether/ether/ketone resin to be used for the present invention, there may be exemplified aromatic polyether/ether/ketones developed by Imperial Chemical Industries, Ltd., England, which can be represented by the following structural formula.

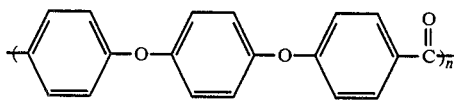

Polyether/ether/ketone resin is in powder form, and has an advantage of being able to be coated on the conduit tube by the electrostatic coating method. The particle size of this resin for use is in a range of from 10 to 100 μm, or preferably from 20 to 70 μm. When the particle size is smaller than 10 μm, the powder particles agglomerate to become unable to attain uniform adherence on the outer peripheral surface of the conduit tube. On the other hand, when the particle size is larger than 100 μm, the coating surface does not assume flat and smooth condition upon its hot-melting to take place after adherence of the resin powder on the conduit tube, which is liable to entrap foams in the interior of the insulating member to make it impossible to provide the insulating member excellent in the hot-water resistant property and the electrical property.

For the metal conduit tube, steel tube or stainless steel tube having high corrosion-resistant property and good electrical conductivity are suitable examples. The conduit tube is preheated to a temperature in a range of from 350° C. to 450° C. In case the conduit tube is not preheated or the preheating temperature is lower than 350° C., fusion-bonding strength between the conduit tube and the polyether/ether/ketone resin coating is low with the consequence that the insulative coating peels off the conduit tube, after the coated tube is immersed and left in hot water for some length of time. When the preheating temperature is higher than 450° C., the polyether/ether/ketone resin brings about heat deterioration to cause decrease in mechanical characteristics, hot-water resistant property, and electrical characteristics of the insulative covering.

Powder of polyether/ether/ketone resin adhered onto the conduit tube by the conventional electrostatic powder coating method is hot-melted at a temperature in a range of from 350° C. to 450° C., or preferably from 380° C. to 430° C. When the melting temperature is lower than 350° C., melt-fluidity of the polyether/ether/ketone resin is not sufficient and the insulative coating is rendered non-uniform; rather, foams are entrapped in the interior of the insulating member to make it unable to provide the insulating member of excellent hot-water resistant property and electrical characteristics. On the other hand, when the melting temperature is higher than 450° C., the polyether/ether/ketone resin brings about thermal deterioration to thereby cause decrease in the mechanical characteristic, the hot-water resistant property, and the electrical characteristics of the insulative coating.

With a view to enabling those persons skilled in the art to readily put the first embodiment of the present invention into practice, the following several actual examples as well as comparative examples are presented.

EXAMPLE 1

Powder of aromatic polyether/ether/ketone resin of the afore-described structural formula, produced by Imperial Chemical Industries, Ltd., England, and processed to have its particle size in a range of from 20 to 70 μm was adhered by the electrostatic coating method onto the outer peripheral surface of the metal conduit tube which has been preheated to 400° C., and then heated for 10 minutes at this temperature level to melt the adhered powder material. As the result, a coating film of polyether/ether/ketone resin was formed on the outer peripheral surface of the conduit tube with a film thickness of 0.5 mm. The operations of the electrostatic coating and the hot-melting were repeated for additional three times (four times in total) to thereby obtain a desired insulating member for the metal conduit tube.

Table 1 below indicates the adhesive strength (kg/cm²) and the voltage withstand value (KV/mm) at 25° C. of the thus obtained insulative member, and the adhesive strength and the voltage withstand value of the same insulating member after it was immersed in hot water at a temperature of 300° C. for 500 hours.

EXAMPLES 2 to 13

The same experiments as in Example 1 above were conducted, with the exception that the preheating temperature of the metal conduit tube and the hot-melting condition of polyether/ether/ketone resin were changed to those shown in Table 1 below, thereby forming the electrically insulating member on the outer peripheral surface of the conduit tube.

The characteristics of the thus obtained electrically insulating member are indicated in Table 1 below.

COMPARATIVE EXAMPLES 1 to 4

The same experiments as in Example 1 above were conducted, with the exception that the preheating temperatures of the metal conduit tube were changed to those shown in Table 1 below, thereby forming the electrically insulating member on the outer peripheral surface of the conduit tube.

The characteristics of the thus obtained electrically insulating member are indicated in Table 1 below.

COMPARATIVE EXAMPLES 5 to 7

The same experiments as in Example 1 above were conducted, with the exception that use was made of polyether/ether/ketone resin powder of the particle sizes as shown in FIG. 2, thereby forming the electrically insulating member on the outer peripheral surface of the conduit tube.

The characteristics of the thus obtained electically insulating member are indicated in Table 2 below.

As is apparent from the results shown in Tables 1 and 2, the conduit tube having the electrically insulative coating according to the present invention is excellent in its electrical characteristic, mechanical characteristic, and hot-water resistant property, so that it is suitable for use as the conduit tube in extracting the underground hydrocarbon resources by the electrical heating method.

The construction of the conduit tube in this second embodiment of the present invention is similar to that shown in FIGS. 1 and 2, with the points of difference residing in that the metal conduit tube same as that used in the first embodiment was preheated to a temperature in a range of from 350° C. to 380° C., and then polyether/ether/ketone resin in powder form having a particle size ranging from 10 μm to 100 μm and having the melt-viscosity ranging from 1400 to 2000 poise at 380° C. was adhered by the electrostatic coating method onto the outer peripheral surface of the preheated conduit tube, followed by melting the resin powder at a temperature in a range of from 350° to 380° C., thereby forming the resin coating on the outer peripheral surface of the conduit tube.

The polyether/ether/ketone resin having the chemical structure as represented by the foregoing general formula is used for the purpose of the second embodiment. When the melt-viscosity of this resin at 380° C. is higher than 2,000 poises, it becomes necessary, at the time of the powder coating, to increase the preheating temperature of the metal conduit tube and the hot-melting temperature of the adhered resin powder, and to prolong the hot-melting time. On account of this, the metal conduit tube is oxidized, accompanying deterioration of the polyether/ether/ketone resin, whereby the insulating member excellent in its hot-water resistant property and electrical characteristics is unable to be obtained. On the other hand, when the melt-viscosity of the resin at 380° C. is lower than 1,400 poises, the melted resin drops off the peripheral surface of the conduit tube, when the resin powder is adhered onto

TABLE 1

| | Preheating temperature (°C.) | Hot-melt conditions | | Initial value | | After hot-water cycle | |
|---|---|---|---|---|---|---|---|
| | | Temp. (°C.) | Time (min.) | Adhesive strength (Kg/cm²) | Voltage withstand (KV/mm) | Adhesive strength (Kg/cm²) | Voltage withstand (KV/mm) |
| Example No. | | | | | | | |
| 1 | 400 | 380 | 10 | 160 | 35 | 155 | 30 |
| 2 | 400 | 380 | 30 | 170 | 36 | 160 | 32 |
| 3 | 400 | 400 | 10 | 185 | 37 | 170 | 32 |
| 4 | 400 | 400 | 20 | 170 | 37 | 155 | 32 |
| 5 | 400 | 430 | 5 | 180 | 35 | 160 | 31 |
| 6 | 400 | 430 | 10 | 170 | 34 | 155 | 30 |
| 7 | 400 | 450 | 5 | 165 | 33 | 140 | 30 |
| 8 | 380 | 380 | 30 | 150 | 32 | 135 | 29 |
| 9 | 380 | 400 | 20 | 155 | 33 | 140 | 30 |
| 10 | 380 | 430 | 10 | 155 | 37 | 145 | 34 |
| 11 | 430 | 400 | 20 | 160 | 34 | 140 | 31 |
| 12 | 430 | 430 | 10 | 165 | 36 | 145 | 33 |
| 13 | 430 | 450 | 5 | 170 | 35 | 150 | 31 |
| Comparative Example | | | | | | | |
| 1 | No preheating | 400 | 10 | 100 | 30 | 10 | 12 |
| 2 | 200 | 400 | 10 | 120 | 30 | 30 | 10 |
| 3 | 350 | 400 | 10 | 130 | 32 | 40 | 8 |
| 4 | 480 | 400 | 10 | 150 | 35 | 35 | 11 |

TABLE 2

| Comparative Example No. | Particle size (μm) | Initial value | | After hot-water cycle | |
|---|---|---|---|---|---|
| | | Adhesive strength (Kg/cm²) | Voltage withstand (KV/mm) | Adhesive strength (Kg/cm²) | Voltage withstand (KV/mm) |
| 5 | 5 | 160 | 32 | 50 | 20 |
| 6 | 200 | 150 | 28 | 30 | 15 |
| 7 | 500 | 130 | 25 | 20 | 12 |

In the following, the second embodiment of the electrically insulated conduit tube according to the present invention will be described.

the outer peripheral surface of the conduit tube and subjected to the hot-melting at the temperature level of 380° C., whereby the resulting coating does not assume the flat and uniform conditions, hence the insulating member having excellent hot-water resistant property and electrical characteristics cannot be obtained.

In case the conduit tube is not preheated or the preheating temperature is lower than 350° C., fusion-bonding strength between the conduit tube and the polyether/ether/ketone resin coating is low with the consequence that the insulative coating peels off the conduit tube, after the coated tube is immersed and left in hot water for some length of time. When the preheating temperature is higher than 380° C., the resin powder exhibits large melt-fluidity when it is adhered onto the outer peripheral surface of the conduit tube, whereby the resulting coating film does not assume flat and uniform conditions, hence the insulating member having excellent hot-water resistant property and electrical characteristics cannot be obtained.

Powder of polyether/ether/ketone resin adhered onto the conduit tube by the electrostatic powder coating method is subjected to the hot-melting at a temperature in a range of from 350° C. to 380° C. When the melting temperature is lower than 350° C., melt-fluidity of the polyether/ether/ketone resin is not sufficient and the resulting insulative coating is rendered non-uniform; rather, foams are entrapped in the interior of the insulating member to make it unable to provide the insulating member of excellent hot-water resistant property and electrical characteristics. On the other hand, when the melting temperature is higher than 380° C., the polyether/ether/ketone resin exhibits large melt-fluidity to cause dropping-off of the melted resin from the outer peripheral surface of the conduit tube, and the resulting insulative coating does not assume the flat and uniform conditions, whereby no insulating member excellent in the hot-water resistant property and the electrical characteristics can be obtained.

In the following, explanations will be made in more detail in reference to several examples and comparative examples as to the coating method of the electrically insulative covering of polyether/ether/ketone resin according to this second embodiment, and the properties of the coating film. Note should be taken that the present invention is not limited to these examples alone.

EXAMPLE 14

Powder of aromatic polyether/ether/ketone resin of the afore-described structural formula, produced by Imperial Chemical Industries, Ltd., having the melt-viscosity ranging from 1,400 to 2,000 poises at 380° C., and processed to have its particle size in a range of from 20 to 70 μm was adhered by the electrostatic coating method onto the outer peripheral surface of the metal conduit tube which had been preheated to 370° C., and then subjected to hot-melting for 10 minutes at this temperature level, thereby forming a coating film of polyether/ether/ketone resin on the outer peripheral surface of the conduit tube with a film thickness of 0.3 mm. The operations of the electrostatic coating and the hot-melting were repeated for additional three times (four times in all) to thereby obtain a desired insulating member for the metal conduit tube.

Table 3 below indicate the adhesive strength (kg/cm²) and the voltage withstand value (KV/mm) at 25° C. of the thus obtained insulating member, and the adhesive strength and the voltage withstand value of the same insulating member measured at 25° C. after it was immersed in hot water at a temperature of 300° C. for 500 hours.

EXAMPLES 15 to 21

The same procedures as in Examples 14 above were followed, with the exception that the preheating temperature of the metal conduit tube and the hot-melting conditions of the polyether/ether/ketone resin were changed to those as shown in Table 3 below for each of these examples, thereby forming the electrically insulating member on the outer peripheral surface of the conduit tube.

The characteristics of the thus obtained electrically insulating member are shown in Table 3 below in each column for Examples 15 to 21.

COMPARATIVE EXAMPLES 8 to 11

The same procedures as in Example 14 above were followed, with the exception that the preheating temperature of the metal conduit tube and the hot-melting conditions of the polyether/ether/ketone resin were changed to those as shown in Table 3 below for each of these comparative examples, thereby forming the electrically insulating member on the outer peripheral surface of the conduit tube.

The characteristics of the thus obtained electrically insulating member are shown in Table 3 below in each column for Comparative Examples 8 to 11.

COMPARATIVE EXAMPLES 12 to 14

The same procedures as in Example 14 above were followed, with the exception that use was made of powder of polyether/ether/ketone resin of a particle size outside the range of the present invention, thereby forming the electrically insulating member on the outer peripheral surface of the conduit tube. The characteristics of the thus obtained electrically insulating member are shown in Table 4 below in each column for Comparative Examples 12 to 14.

COMPARATIVE EXAMPLES 15 to 17

The same procedures as in Example 14 above were followed, with the exception that use was made of powder of polyether/ether/ketone resin of a particle size outside the range of the present invention, thereby forming the electrically insulating member on the outer peripheral surface of the conduit tube. The characteristics of the thus obtained electrically insulating member are shown in Table 5 below in each column for Comparative Examples 15 to 17.

As is apparent from the results shown in Tables 3, 4 and 5, the conduit tube having thereon the electrically insulative coating according to the present invention is excellent in its electrical characteristics, mechanical characteristics, and hot-water resistant property, so that it is suitable for use as the conduit tube of the electrode device for extracting the underground hydrocarbon resources by the electrical heating method.

TABLE 3

| | Preheating temperature (°C.) | Hot-melt conditions | | Initial value | | After hot-water cycle | |
|---|---|---|---|---|---|---|---|
| | | Temp. (°C.) | Time (min.) | Adhesive strength (Kg/cm²) | Voltage withstand (KV/mm) | Adhesive strength (Kg/cm²) | Voltage withstand (KV/mm) |
| Example No. | | | | | | | |
| 14 | 370 | 370 | 10 | 150 | 32 | 140 | 29 |
| 15 | 370 | 370 | 30 | 160 | 38 | 155 | 33 |
| 16 | 370 | 380 | 10 | 180 | 36 | 165 | 30 |
| 17 | 370 | 350 | 20 | 155 | 33 | 150 | 31 |

TABLE 3-continued

|  | Preheating temperature (°C.) | Hot-melt conditions | | Initial value | | After hot-water cycle | |
| --- | --- | --- | --- | --- | --- | --- | --- |
|  |  | Temp. (°C.) | Time (min.) | Adhesive strength (Kg/cm²) | Voltage withstand (KV/mm) | Adhesive strength (Kg/cm²) | Voltage withstand (KV/mm) |
| 18 | 380 | 380 | 5 | 153 | 29 | 145 | 28 |
| 19 | 380 | 350 | 20 | 160 | 32 | 155 | 29 |
| 20 | 350 | 350 | 30 | 165 | 35 | 153 | 32 |
| 21 | 350 | 380 | 10 | 154 | 30 | 150 | 28 |
| Comparative Example |  |  |  |  |  |  |  |
| 8 | No preheating | 380 | 10 | 110 | 28 | 40 | 11 |
| 9 | 300 | 380 | 10 | 130 | 27 | 30 | 12 |
| 10 | 340 | 380 | 10 | 120 | 29 | 35 | 14 |
| 11 | 400 | 400 | 10 | 105 | 30 | 25 | 11 |

TABLE 4

| Comparative Example No. | Particle size (μm) | Initial value | | After hot-water cycle | |
| --- | --- | --- | --- | --- | --- |
|  |  | Adhesive strength (Kg/cm²) | Voltage withstand (KV/mm) | Adhesive strength (Kg/cm²) | Voltage withstand (KV/mm) |
| 12 | 5 | 145 | 25 | 45 | 15 |
| 13 | 200 | 150 | 29 | 35 | 18 |
| 18 | 500 | 120 | 20 | 25 | 12 |

TABLE 5

| Comparative Example No. | Melt viscosity at 380° C. (poise) | Initial value | | After hot-water cycle | |
| --- | --- | --- | --- | --- | --- |
|  |  | Adhesive strength (Kg/cm²) | Voltage withstand (KV/mm) | Adhesive strength (Kg/cm²) | Voltage withstand (KV/mm) |
| 15 | 1000 | 130 | 28 | 60 | 18 |
| 16 | 3000 | 120 | 30 | 40 | 15 |
| 17 | 5000 | 100 | 25 | 30 | 10 |

In the following, the third embodiment of the electrically insulated conduit tube according to the present invention will be described.

In this embodiment, the electrically insulated conduit tube of the electrode device for electrically heating the underground hydrocarbon resources can be obtained by applying inorganic coating material of alkali silicates or metal phosphate onto the outer peripheral surface of the conduit tube shown in FIGS. 1 and 2, followed by curing the same to form the first coating film, and then adhering polyether/ether/ketone resin by the electrostatic powder coating method over this first coating film to form the second coating film. The thus obtained electrically insulated conduit tube satisfies all the characteristics required of the conduit tube as mentioned in the foregoing (a), (b) and (c).

The polyether/ether/ketone resin to be used for this third embodiment is also same as that can be represented by the structural formula as already explained in the foregoing first embodiment of the present invention.

The inorganic coating material of alkali silicate to form the first coating can be prepared by adding to aqueous solution of sodium silicate, potassium silicate, or lithium silicate a filling material such as alumina or silica, and a curing agent such as (i) phophorus acid, (ii) metal phosphates like aluminum phosphate, zinc phosphate, magnesium phosphate, ferrous phosphate, and so on, (iii) metals like zinc, magnesium, and so forth, (iv) metal oxides like zinc oxide, magnesium oxide, zirconium oxide, and so on, (v) metal carbonates like zinc carbonate, magnesium carbonate, calcium carbonate, aluminum carbonate, and so forth, (vi) metal sulfates like zinc sulfate, magnesium sulfate, calcium sulfate, aluminum sulfate, and so forth, or (vii) metal chlorides like zinc chloride, magnesium chloride, calcium chloride, aluminum chloride, and so on.

As the inorganic coating material of metal phosphate, there may be used those which are prepared by adding to aqueous solution of aluminum phosphate, calcium phosphate, magnesium phosphate, ferrous phosphate, or zinc phosphate a filling material such as alumina or silica, and a curing agent such as aluminum oxide, silicon oxide, titanium oxide, ferrous oxide, or tin oxide.

The second coating film of the polyether/ether/ketone resin may be formed on the outer peripheral surface of the metal conduit tube by the electrostatic powder coating method in the following manner: the resin powder is adhered onto the conduit tube which has been preheated to a temperature in a range of from 350° C. to 450° C., and then the adhered powder material is subjected to hot-melting under heat of from 350° C. to 450° C. Here, it has been known that the coating film of the polyether/ether/ketone resin has a remarkably different expansion coefficient from that of the metal conduit tube, which brings about large internal stress in the fusion-bonded surface between the metal conduit tube and the coating film to decrease the adhesive force between them. Accordingly, the coating film of the polyether/ether/ketone resin which is formed directly on the outer peripheral surface of the conduit tube can be of no practical use, because the polyether/ether/ketone resin coating film exfoliates from the surface of the conduit tube when it is subjected to repeated hot-water cycle of a temperature level of 25° C. and 300° C. In contrast to this, the polyether/ether/ketone resin coating film formed on the outer peripheral surface of the conduit tube by first applying the above-mentioned inorganic coating material of alkali silicate or inorganic coating material of metal phosphate onto the outer peripheral surface of the conduit tube, drying the applied coating material, and heating the coating material at a predetermined temperature to react to form a cured inorganic coating film, and thereafter forming the polyether/ether/ketone resin coating film over this inorganic coating film has been verified to exhibit a large adhesive force and to be durable against the hot-water cycle at a temperature of 25° C. and 300° C. Therefore, it is suitable device for electrically heating the oil sand deposit.

The following examples and comparative examples are to enable those persons skilled in the art to readily practice the third embodiment of the present invention.

EXAMPLE 22

Aqueous inorganic coating material of 20% concentration in terms of a solid content (the compositional ratio in weight of the solid content being 100 parts of alumina and 5 parts of aluminum phosphate) was applied on the outer peripheral surface of the conduit tube, and cured by heating at 90° C. for two hours and at 200° C. for five hours, thereby forming the first coating film of 0.05 mm in thickness consisting of the inorganic substance. Subsequently, the conduit tube having the inorganic coating film formed thereon was preheated to a temperature of 380° C., followed by adhering powder of polyether/ether/ketone resin thereon by the electrostatic powder coating method, and hot-melting the resin pwoder at 380° C. for ten minutes, thereby forming the second coating film of polyether/ether/ketone resin in a film thickness of 0.3 mm on the outer peripheral surface of the conduit tube. The operations of the electrostatic powder coating and the hot-melting were repeated for additional three times (four times in all) to obtain the desired insulative coating for the conduit tube.

Table 6 below indicates, in its column for Example 22, the adhesive strength (kg/cm²) and the voltage withstand value (KV/mm) at 25° C. of the thus obtained insulative coating, and the adhesive strength and the voltage withstand value of the same insulative coating measured at 25° C. after it was subjected to the hot-water cycle for five times (a single hot-water cycle consists of heating the insulative member at 300° C. in hot water, keeping it for 100 hours in the hot water of 300° C., and cooling it down to 25° C.).

EXAMPLES 23 to 35

The same procedures as in Example 22 above were followed, with the exception that the compositional ratio of the solid content in the inorganic coating material and its hot-curing conditions were varied, thereby forming the electrically insulative member on the outer peripheral surface of the conduit tube.

The characteristics of the thus obtained electrically insulating member are shown in Table 6 below in the column for Examples 23 to 35.

COMPARATIVE EXAMPLES 18 and 19

The electrically insulative covering was formed by directly applying polyether/ether/ketone resin on the outer peripheral surface of the conduit tubes which have undergone both no treatment and blast treatment.

The characteristics of the thus formed electrically insulating members are shown in FIG. 7 below.

As is apparent from the results shown in Tables 6 and 7, the conduit tube having thereon the electrically insualtive coating according to the third embodiment of the present invention is excellent in its electrical characteristics, mechanical characteristics, and hot-water resistant property, hence it can exhibit particular effect as the conduit tube of the electrode device to used for extracting the underground hydrocarbon resources by the electrical heating method.

TABLE 6

| | Inorganic coating material | | | | | | | Characteristics | | | |
|---|---|---|---|---|---|---|---|---|---|---|---|
| | Principal component | | Filler | | Curing agent | | | Initial value | | Hot-water cycle (Ater 5 cycles) | |
| Example No. | Compound Name | Mixing rate | Compound Name | Mixing rate | Compound Name | Mixing rate | Heat-curing conditions | Adhesive strength (Kg/cm²) | Voltage withstand (KV/mm) | Adhesive strength (Kg/cm²) | Voltage withstand (KV/mm) |
| 22 | Sodium silicate | 100 | Alumina | 100 | Aluminum phosphate | 5 | 90° C. (2 hrs) +120° C. (5 hrs) | 160 | 33 | 145 | 30 |
| 23 | Sodium silicate | 100 | Alumina | 100 | Zinc | 3 | 90° C. (2 hrs) +200° C. (5 hrs) | 170 | 34 | 150 | 28 |
| 24 | Sodium silicate | 100 | Alumina | 100 | Magnesium oxide | 5 | 90° C. (2 hrs) +180° C. (6 hrs) | 150 | 39 | 145 | 32 |
| 25 | Sodium silicate | 100 | Alumina | 100 | Potassium carbonate | 5 | 90° C. (2 hrs) +200° C. (5 hrs) | 155 | 35 | 143 | 27 |
| 26 | Sodium silicate | 100 | Alumina | 100 | Zinc sulfate | 5 | 90° C. (2 hrs) +200° C. (5 hrs) | 153 | 30 | 145 | 25 |
| 27 | Sodium silicate | 100 | Alumina | 100 | Aluminum chloride | 3 | 90° C. (2 hrs) +150° C. (6 hrs) | 165 | 28 | 152 | 25 |
| 28 | Potassium silicate | 100 | Alumina | 100 | Zinc oxide | 5 | 90° C. (2 hrs) +200° C. (6 hrs) | 158 | 35 | 147 | 30 |
| 29 | Lithium silicate | 100 | Alumina | 100 | Zinc phosphate | 5 | 90° C. (2 hrs) +200° C. (5 hrs) | 145 | 33 | 139 | 28 |
| 30 | Sodium silicate | 100 | Silica | 100 | Aluminum phosphate | 5 | 90° C. (2 hrs) +200° C. (5 hrs) | 155 | 38 | 144 | 30 |
| 31 | Aluminum phosphate | 100 | Alumina | 100 | Aluminum oxide | 5 | 90° C. (2 hrs) +300° C. (8 hrs) | 163 | 32 | 152 | 28 |
| 32 | Calcium phosphate | 100 | Alumina | 100 | Silicon oxide | 5 | 90° C. (2 hrs) +350° C. (8 hrs) | 145 | 33 | 140 | 30 |
| 33 | Magnesium phosphate | 100 | Alumina | 100 | Titanium oxide | 5 | 90° C. (2 hrs) +350° C. (8 hrs) | 157 | 34 | 145 | 30 |
| 34 | Ferrous phosphate | 100 | Alumina | 100 | Tin oxide | 5 | 90° C. (2 hrs) +400° C. (8 hrs) | 148 | 31 | 140 | 25 |
| 35 | Zinc phosphate | 100 | Silica | 100 | Iron oxide | 5 | 90° C. (2 hrs) +400° C. (8 hrs) | 162 | 30 | 153 | 26 |

TABLE 7

| Comparative Example No. | Ground surface treatment of conduit tube | Initial value | | Hot-water cycle (After 5 cycles) | |
|---|---|---|---|---|---|
| | | Adhesive strength (Kg/cm$^2$) | Voltage withstand (KV/mm) | Adhesive strength (Kg/cm$^2$) | Voltage withstand (KV/mm) |
| 18 | No treatment | 145 | 34 | 0 (Exfoliated) | No measurement could be done |
| 19 | Blasted | 150 | 32 | 0 (Exfoliated) | No measurement could be done |

In the following, the fourth embodiment of the present invention will be explained in reference to FIGS. 3 and 4. In the drawing, the same reference numerals as those in FIGS. 1 and 2 designate the identical or equivalent parts.

Figure 3:
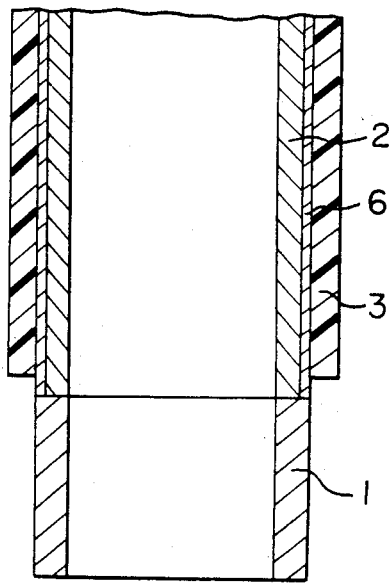
FIG. 3 is a longitudinal cross-sectional view, in part, showing another embodiment of the present invention.
Figure 4:
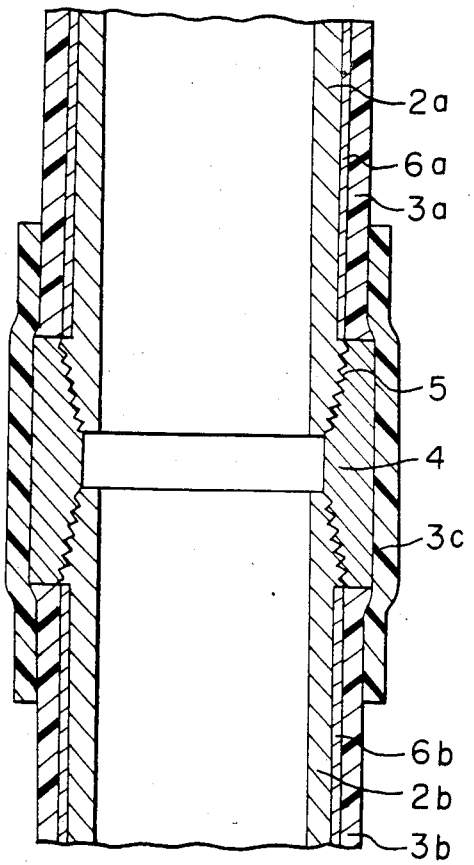
FIG. 4 is a longitudinal cross-sectional view showing a joined portion of the conduit tube shown in FIG. 3.

In FIG. 3, a metal coating film 6 is formed by the flame coating method on the outer peripheral surface of the metal conduit tube 2 with the electrode 1 being supportively connected at the bottom end part thereof, and the insulative covering 3 is formed over this metal coating film 6 by the electrostatic powder coating method.

In general, the metal conduit tube 2 is required to be as long as about 200 meters to about 600 meters in its full length. However, since ordinary steel tube or stainless steel tube has a length per piece of from 5 to 50 meters, a plurality of the conduit tubes of such length are joined one after the other, when the forward end of the foremost tube having the electrode attached to its distal end is being inserted into the oil sand deposit. FIG. 4 illustrates a longitudinal cross-sectional view, in part, of a joined portion of the conduit tubes, each being coated with the electrically insulative covering. As shown in the drawing, the conduit tube 2a covered with the metal coating film 6a and the electrically insulative coating film 3a is joined with the conduit tube 2b covered with the metal coating film 6b and the electrically insulative coating film 3b through the tapered thread 5 formed at the end part, and on the outer peripheral surface, of each of the conduit tubes 2a and 2b by use of the coupling 4 which is screw-fitted with the thread 5 on the tubes. In this case, the joined portion, i.e., the outer peripheral surface of the coupling 4 and the end parts of both conduit tubes 2a and 2b are further coated with the electrically insulating layer 3c with a view to preventing leakage of electricity from the joined portion.

The flame coating method to be adopted for forming the metal coating film, there may generally be employed the gas type flame coating method or the gas explosion type flame coating method using combustion flame of oxygen and fuel (such as acetylene, propane, hydrogen, and so forth) as the heat source; or the arc type flame coating method, plasma jet type flame coating method, or the high frequency induction type flame coating method using electric energy as the heat source. By these flame coating methods, it is possible to form the metal coating on the outer peripheral surface of the metal conduit tube with high temperature metal particles being deposited thereon in laminar form.

As the material for the metal coating to be used in the present invention, there may be listed those metal materials of a kind different from that constituting the metal conduit tube. These metal materials are: nickel (Ni), aluminum (Al), chromium (Cr), silicon (Si), iron (Fe), etc., and alloys of these metal materials such as nickel-/aluminum alloy (Ni-Al), nickel/chromium alloy (Ni-Cr), silica/aluminum alloy (Si-Al), and so forth. These metal materials are employed for the flame coating method in the form of powder or rod.

As the electrically insulating member, there may be used polyether/ether/ketone resin which should preferably be the one as represented by the structural formula as in the first embodiment of the invention.

The metal conduit tube suitable for the purpose of this embodiment is steel tube or stainless steel tube having excellent corrosion-resistant property and good electrical conductivity.

When the covering of the polyether/ether/ketone resin is formed on the surface of the metal conduit tube by the electrostatic powder coating method, the resin in powder form is adhered onto the conduit tube preheated to a temperature in a range of from 350° C. to 450° C., followed by heating the adhered resin powder again at a temperature in the range of from 350° C. to 450° C., thereby fusion-bonding the powder material to the surface of the conduit tube. In this case, since the covering of the polyether/ether/ketone resin has a remarkably different expansion coefficient from that of the metal conduit tube, there occurs a great internal stress in the fusion-bonded surface between the metal conduit tube and the polyether/ether/ketone resin covering, whereby the adhesive force between them decreases. Thus, the covering of polyether/ether/ketone resin which has been formed directly on the surface of the metal conduit tube cannot be put in practical use to extracting oil by repeatedly heating of the oil sand deposit with use of the electrode attached to the conduit tube covered with the resin coating, because the polyether/ether/ketones resin coating peels off the surface of the conduit tube when it is subjected to repeated hot-water cycle at a temperature of 25° C. and 300° C. On the contrary, however, the above-mentioned metal coating film of 0.2 mm or below in thickness which has been formed on the metal conduit tube surface by the flame coating method has a large adhesive strength with the polyether/ether/ketone resin, and is durable against the hot-water cycle at a temperature of 25° C. and 300° C. Therefore, the insulative coating according to this fourth embodiment of the present invention is suitable for the conduit tube of the electrode device for electrically heating the oil sand deposit.

In the following, several examples and comparative examples are presented for enabling those persons skilled in the art to practice the fourth embodiment of the present invention.

EXAMPLE 36

Nickel powder was sprayed onto the outer peripheral surface of the metal conduit tube by the plasma-het type flame coating method, thereby forming the nickel coating to a film thickness of 0.1 mm. Subsequently, the metal conduit tube, on which the metal coating film had been formed, was preheated to 380° C., followed by adherence of polyether/ether/ketone resin powder over the metal coating film by the electrostatic powder coating method, and hot-melting of the resin powder at 380° C. for ten minutes, thereby forming the polyether-/ether/ketone resin coating film of 0.3 mm thick on the metal conduit tube surface. The operations of these electrostatic powder coating and hot-melting were repeated for additional three times (four times in all) to thereby obtain a desired electrically insulative coating film.

electrically insulative coating film are as shown in Table 9 below.

As is apparent from the results shown in Tables 8 and 9, the conduit tube coated with the electrically insulative covering according to the fourth embodiment of the present invention is excellent in its electrical property, mechanical property, and hot-water resistant property, so that it is suitable as the conduit tube of the electrode device for use in extracting the underground hydrocarbon resources by the electrical heating method.

TABLE 8

| Example No. | Metal coating | Thickness of metal coating (mm) | Initial Value | | Hot-water cycle (After 5 cycles) | |
|---|---|---|---|---|---|---|
| | | | Adhesive strength (kg/cm²) | Voltage withstand (KV/mm) | Adhesive strength (Kg/cm²) | Voltage withstand (KV/mm) |
| 36 | Nickel | 0.1 | 145 | 32 | 130 | 28 |
| 37 | Nickel | 0.06 | 140 | 28 | 128 | 24 |
| 38 | Nickel | 0.2 | 135 | 27 | 128 | 24 |
| 39 | Aluminum | 0.1 | 150 | 24 | 135 | 21 |
| 40 | Chromium | 0.1 | 143 | 35 | 138 | 29 |
| 41 | Silicon | 0.1 | 155 | 33 | 140 | 26 |
| 42 | Iron | 0.1 | 147 | 31 | 135 | 25 |
| 43 | Nickel/Aluminum | 0.1 | 150 | 28 | 142 | 23 |
| 44 | Nickel/Chromium | 0.1 | 142 | 26 | 136 | 23 |
| 45 | Silica/Aluminum | 0.1 | 146 | 32 | 138 | 28 |

TABLE 9

| Comparative Example No | Ground surface treatment of conduit tube | Initial value | | Hot-water cycle (After 5 cycles) | |
|---|---|---|---|---|---|
| | | Adhesive strength (Kg/cm²) | Voltage withstand (KV/mm) | Adhesive strength (Kg/cm²) | Voltage withstand (KV/mm) |
| 20 | No treatment | 145 | 34 | 0 (Exfoliated) | No measurement could be done |
| 21 | Blast | 150 | 32 | 0 (Exfoliated) | No measurement could be done |

The adhesive strength (kg/cm²) and the voltage withstand value (KV/mm) of the thus obtained electrically insulative coating at 25° C., and the adhesive strength and the voltage withstand value of the same insulative coating film measured at 25° C. after it was subjected to the hot-water cycle for five times (a single "hot-water cycle" consists of heating the insulative member at 300° C. in hot-water, keeping it for 100 hours in the hot-water of 300° C., and cooling it down to 25° C.) The results are shown in Table 8 below in the column for Example 36.

EXAMPLES 37 to 45

The same experiments as in Example 36 above were conducted with the exception that the metal coating film was replaced by those in Table 8, thereby forming the electrically insulating coating film on the outer peripheral surface of the conduit tube. The characteristics of the thus obtained electrically insulative coating film are shown in Table 8 below in each column for Examples 37 to 45.

COMPARATIVE EXAMPLES 20 to 21

The polyether/ether/ketone resin covering was directly formed on the outer peripheral surface of the conduit tube. The characteristics of the thus obtained Although, in the foregoing, several preferred examples of practicing the present invention have been presented, it should be noted that they are merely illustrative and not so restrictive, and that any changes and modifications in the material used and/or the film forming conditions may be made by those skilled in the art within the spirit and scope of the present invention as recited in the appended claims.

We claim:

1. An improved electrically insulating covering for conduit tubes used for encasing electrode devices which are used in the extraction of oil from oil sand wherein said conduit tubes have a metal conduit tube and an electrically insulating covering adhered to said outer peripheral surface of said metal conduit tube wherein said improved electrically insulating covering comprises:

a powdered polyether/ether/ketone resin having a particle size of the range of from 10 to 100 μm which has been placed in contact with said metal conduit tube by way of electrostatic coating said metal conduit tube and wherein said powdered polyether/ether/ketone adhered to said metal conduit tube, by way of fusionbonding, in a temperature range of from 350° C. to 450° C. to and wherein said metal conduit tube has been preheated prior to the adherance of said polyether/ether/ketone to a temperature range of from 350° C. to 450° C.

2. An improved electrically insulated covering according to claim 1, wherein the outer peripheral surface of said metal conduit tube is preheated to a temperature in a range of from 350° C. to 380° C., and said polyether/ether/ketone resin in powder form is fusionbonded on said outer peripheral surface thereof at a temperature in a range of from 350° C. to 380° C.

3. An improved electrically insulating coating as in claim 1 or claim 2 further comprising:
a separate inorganic coating material interposed between said powdered polyether/ether/ketone resin and said metal conduit tube.

4. An improved electrically insulating coating as in claim 1 or claim 2 further comprising:
a flame coated metal coating film interposed between said powdered polyether/ether/ketone resin and said metal conduit tube.

5. The conduit tube according to claim 3, wherein said inorganic coating material is alkali silicate.

6. The conduit tube according to claim 3, wherein said inorganic coating material is metal phosphate.

7. The conduit tube according to claim 4, wherein said metal coating film is made of one metal materail selected from the group consisting of nickel, aluminum, chromium, silicon, and iron.

8. The conduit tube according to claim 4, wherein said metal coating film is made of one metal material selected from the group consisting of nickel-aluminum alloy, nickel-chromium alloy, and silica-aluminum alloy.

* * * * *